United States Patent [19]

Shapiro

[11] 4,272,190

[45] Jun. 9, 1981

[54] OPTICAL MEASURING SYSTEM

[75] Inventor: Alan R. Shapiro, Santa Monica, Calif.

[73] Assignee: Typalogics, Santa Monica, Calif.

[21] Appl. No.: 933,465

[22] Filed: Aug. 14, 1978

[51] Int. Cl.³ ............................................. G01B 9/00
[52] U.S. Cl. ................................................... 356/124
[58] Field of Search ..................... 356/124, 124.5, 126, 356/127, 125, 400, 152

[56] References Cited

U.S. PATENT DOCUMENTS

| | | | |
|---|---|---|---|
| 3,136,839 | 6/1964 | Safir | 356/126 |
| 3,436,154 | 4/1969 | Baker et al. | 356/124 |
| 3,572,909 | 3/1971 | van Patten et al. | 351/6 |
| 3,701,602 | 10/1972 | Bergin et al. | 356/152 |
| 3,819,256 | 6/1974 | Bellows et al. | 250/200 X |
| 3,877,788 | 4/1975 | Sprague et al. | 356/124 |
| 3,977,789 | 8/1976 | Hunter et al. | 356/124 X |
| 4,130,361 | 12/1978 | Humphrey | 356/125 |
| 4,139,305 | 2/1979 | Lapornik | 356/125 |

*Primary Examiner*—John K. Corbin
*Assistant Examiner*—Bruce Y. Arnold
*Attorney, Agent, or Firm*—Wagner & Bachand

[57] ABSTRACT

Automatic test equipment for determining the optical properties of a test object is described. A highly collimated test beam of approximately one millimeter diameter is directed through the test object, is reflected, and passes through the test object a second time. The test beam source may be a laser and spatial filter, or equivalent. The reflected beam intensity and the exit point and return slope angle at which this beam leaves the test object are accurately measured to determine the optical characteristics of the test object. In one described embodiment, the exit point is determined by moving a knife edge to a point where half the light is blocked. The angle is determined by focusing the reflected beam and determining the position of the focal point, i.e. image height, by means of a pinhole mounted on a three axis micrometer platform. The light transmitted through the pinhole is detected by a light sensitive diode or equivalent. The entrance point of the test beam is determined by a mirror driven by a micrometer. A computer may be used to automatically drive all the micrometer scans and print out a numerical analysis of the optical properties of the test object. A second embodiment requires the test object to be located two focal lengths from an off-axis paraboloid mirror. A pinhole is located at the focal plane to determine the slope and a means for determining the beam position is located at the conjugate plane to measure the height of the exit beam. The second embodiment is more easily automated since the image height can be measured directly by any one of several electrical devices.

26 Claims, 5 Drawing Figures

OPTICAL MEASURING SYSTEM

BACKGROUND OF THE INVENTION

This invention relates to automatic test equipment for testing optical systems and more particularly describes a system for automatically determining the optical characteristics of any optical test object by directing laser beams through the lens elements and measuring the exit points, slopes and intensities of the reflected beams.

Test apparatus for optical systems may be thought of as being divided into two types, those that measure the parameters of the human eye and those that measure the parameters of man-made optical systems. One well known apparatus for the examination of the eye is an ophthalmoscope. This instrument is used primarily to view the internal parts of the eye, but also can be used as a rough measure of the eye lens refractive power, in that the degree of adjustment of the ophthalmoscope lens to bring the subject's retina into focus is also a measurement of the refractive power of the patient's eye lens. The refractive power of a medium is a measure of the amount of deflection from a straight line undergone by a light ray in passing obliquely through the medium. In the eye, it is a measure of the distance between the lens and the focal point, and determines near or far-sightedness. The accuracy of the ophthalmoscope for determining the refraction is limited. Thus, an accurate measurement of a patient's eye is not practically obtainable with an ophthalmoscope.

Retinoscopes are used in conjunction with refractors to determine the refractive condition of the eye but the test results are approximate and require an operator of skill, and patience on the part of the subject.

Because of the shortcomings of these and other standard equipment and techniques now available, the most common method of determining the refractive condition of the eye is the subjective one where the subject views a variety of targets through various lenses and decides which set of lenses produces the clearest image. This method is, of course, time consuming and subjective on the part of both the patient and the operator. Further, the equipment operator does not know what is actually being seen by the patient.

In the case of man-made optical systems, a variety of equipment is also available. In one test apparatus, a collimated light beam is directed towards the entrance pupil and the light which is found to be emanating from the other side of the lens is collected and analyzed to determine the optical characteristics of the test object. This technique can be used with single lenses and multi-element lenses if the image space is accessible. Sometimes, however, it is inconvenient to access the image space.

Another method is to analyze the differences in images formed by the test device when its entrance pupil is only partially illuminated.

The methods mentioned above are time-consuming, require considerable expertness, and suffer from poor signal to noise characteristics. Various interferrometric techniques are also employed but these are less popular because of their sensitivity to environmental perturbations and the requirement for even greater operator expertness.

What is required by the optical industry is a compact, economic test apparatus for determining the optical characteristics of any test object, including the human eye, which can be used automatically to test the optical characteristics of the test object in a minimum amount of time.

SUMMARY OF THE INVENTION

In the described apparatus, a laser beam with a diameter of approximately one millimeter is directed into the entrance pupil of a test object, is reflected by a surface after passing through the test object and is then reflected back out of the pupil of the test object where it is analyzed. The analysis of this reflected beam includes a determination of the location of the point and angle at which the reflected beam leaves the test object, and the reflected beam intensity as compared to the test beam intensity. A determination of these three factors completely categorizes the optical properties of the test object.

More specifically, the test beam is generated by a laser and spatial filter to produce a highly collimated beam approximately one millimeter in diameter. A mirror positioned at an angle of forty-five degrees is used to reflect this beam into the test object, said mirror being driven laterally by a micrometer drive so that the entrance angle of the test beam will always be parallel to the axis of the test object. After passing through the elements of the test object, the beam is reflected back through the test object by a surface. In the case of the eye, this reflection occurs at the retina. In the case of binoculars or other optical instruments, the reflection will be caused by light reflected by the reticle or eyepiece. In the usual case, an amount of light in the order of one to two percent of the original test beam is reflected back through the test object. The reflected beam exits the test object at a particular intensity, location and angle.

Since the test beam enters the test object at a normal angle, the extent to which the reflected beam deviates from a normal angle is an indication of the aberration of the lens, where aberration is defined as the failure of a lens to produce exact point-to-point correspondence between an object and its image. Similarly, in a nominal lens, the distance from the central axis to the input beam should be equal to the distance from the central axis to the reflected beam. To the extent that these distances differ, the lens is defective. The exit point and angle of the reflected beam are measured by determining the center point of the beam as it leaves the test object and the point at which the center of the beam is located after travelling a predetermined distance.

The point at which the beam leaves the test object is determined by using a micrometer scan to drive a knife edge to intersect the beam at a point in close proximity to the test object. As the knife edge is advanced into the beam, the point at which the knife edge intersects exactly half of the beam is used as its exit point. The beam intensity is measured at a light sensitive device to make this intensity determination.

The location of the center of the beam at some predetermined distance away from the test object is determined by positioning a pinhole by means of a micrometer scan; the amount of light proceeding through the pinhole being determined by a photo sensitive diode or equivalent. The pinhole is located at the focal point of an analyzer lens, which focuses the beam, and then the location of the pinhole is used as the location of the beam center. Having thus located the center of the beam at a point close to the test object and at a point a predetermined distance away from the test object, the exit point and the slope of the reflected beam is computed.

The relative intensity of the reflected beam in comparison with the test beam is also determinable using this equipment. For instance, a test optical system which reflects a known percent of the test beam may be substituted for the test object to calibrate the light sensitive diode. Then, the test object is replaced and a relative reading of light intensity determined.

In order to determine completely the optical properties of the test object, test measurements must be taken along two radii of the test object, said radii being ninety degrees apart, to determine astigmatism or de-centering of the test object. A total of, perhaps, five readings per radius should be sufficient, the result of these ten readings being a complete measurement of the optical properties of the test object. The output of the light sensitive diode is transmitted to a computer for analysis, and the computer, in certain embodiments hereof, is adapted to drive:

(1) the micrometer scan apparatus for the mirror which determines the entrance point of the beam;

(2) the adjustment mechanism for the light blocking knife edge; and (3) the apparatus for determining the location of the focal point. Thusly driven, this equipment is completely automated.

In the case of an eye being used as a test object, the apparatus is rotated ninety degrees to enable test readings to be taken along two radii of the eye. In the case of binoculars, camera lenses or any other man-made optical test objects, the test object is rotated ninety degrees. In either case the result is a compact and highly accurate system for the automatic measurement of test objects.

In use as an eye measuring device, the computer is able to print out a prescription for eye glasses or a numerical description of eye disorders such as glaucoma. Alternatively, this apparatus is useful as an automatic quality control station at the end of a production line to test various optical systems, the computer printout comprising a "pass" indication or an error message, describing the failure mode in case the test object did not pass the inspection.

The apparatus described herein thus provides a system for the automated determination of all of the optical properties of test objects, including the human eye and complex optical systems, and more specifically comprises a means for generating a test beam of light parallel to the test object axis and directed at a point on the first surface of, and into, said test object. An internal reflecting surface reflects the test beam back through the test object, and out of the first surface. Means for determining the point at which the reflected beam exits said test object at the first surface, means for measuring the intensity of the reflected beam and means for measuring the angle between the test object axis and the reflected beam complete the apparatus.

In the preferred embodiment, the test beam is generated by a laser and a spatial filter, and the reflected beam is measured through the use of an analyzer lens for focusing the light, a pinhole for finding the center of the focused beam and a light detector for measuring the amount of light coupled through the analyzer lens. A three-axis micrometer is adapted to scan the pinhole to find the location of the beam's focal point.

The means for locating the point at which the reflected beam leaves the test object surface comprises a knife edge for partially blocking the light and a one-axis micrometer for varying the position of the knife edge.

The position of the test beam at the surface of the test article is varied by a mirror for reflecting the test beam onto the surface and a third micrometer scan for varying the mirror position.

The system is automated by connecting a digital voltmeter to measure the electrical signal generated by the means for detecting the reflected beam intensity, and using a computer to control the mirror, knife edge and pinhole micrometer platforms, and to generate a printout of the test object optical properties.

A series of measurements along two radii ninety degrees apart will completely categorize the test object optical properties. Alternatively a set of readings along one radius and another annular set of readings at an equal distance from the test object center would be equivalent.

A second embodiment uses an off-axis paraboloid mirror located two focal lengths from said test object to reflect said reflected beam. A pinhole or equivalent is located at the paraboloid mirror's focal plane to determine the slope of the reflected beam, and a moveable light detector or electrical equivalent is used at the conjugate plane to determine the height of the reflected beam. This embodiment may also be controlled by a computer.

BRIEF DESCRIPTION OF THE DRAWINGS

This invention may be more clearly understood by the following detailed description and by reference to the drawings in which.

DETAILED DESCRIPTION OF THE INVENTION

Figure 1:
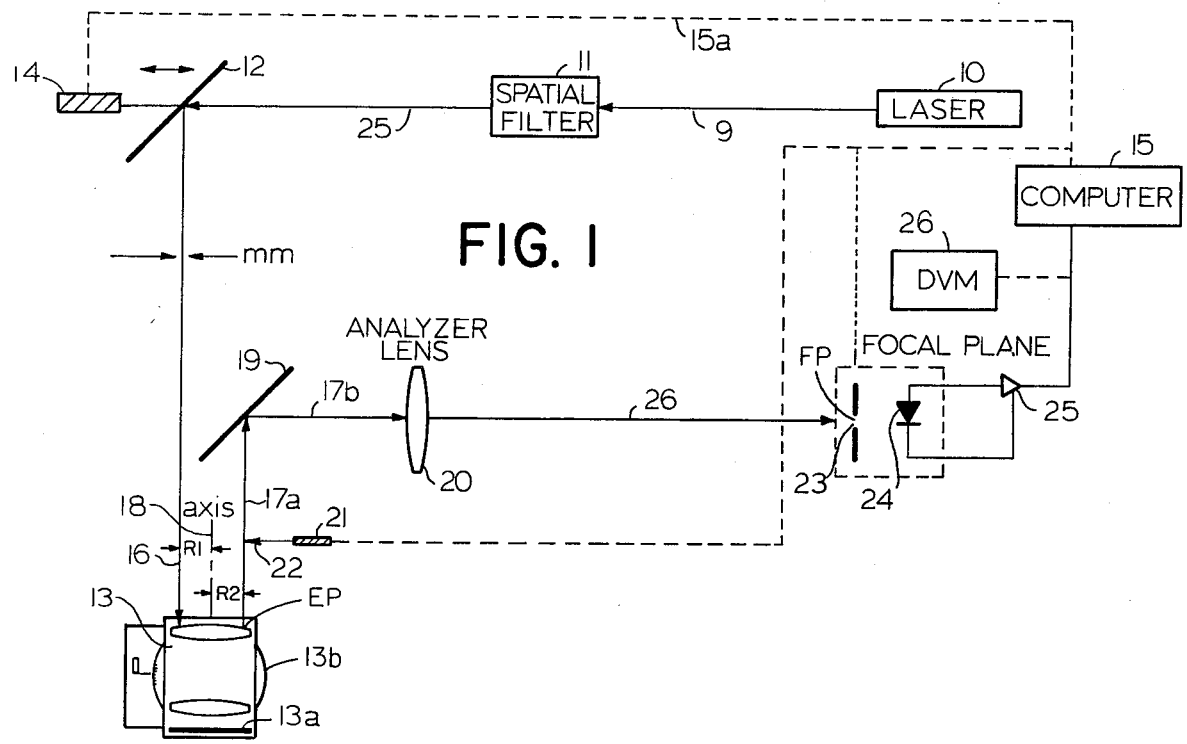
FIG. 1 is a block diagram of the test apparatus showing the spatial relationships of the various components.

It is well-known that the intensity distribution in the retroreflected field formed by an optical system contains information about the system's image-forming properties. This phenomenon has been employed for many years by optometrists and has recently been implemented in automated refractometers. The prior art, devices, however, are limited as to their generality, in precision and convenience. In particular, these devices only provide a determination of defocus and astigmatism. My invention provides the analytical concepts and apparatus necessary to extend this approach to the determination of the primary aberrations of an unknown system in accordance with Seidel as described in Born and Wolf, Principles of Optics, Pergamon Press, Fourth Edition 1970, Page 211 et seq. THEORY The intensity distribution in the retroreflected pattern, $J(R,\theta,\phi)$ is related to the retroreflected field in the aperture $(r,\phi')$ of the device under test by the Huygens-Fresnel integral per Born and Wolf, Supra, at Page 370 et seq. Thus $$J(R,\theta,\phi) = \frac{J_o \cos^2\alpha}{R^2} k \left(\frac{A}{\lambda}\right)^2 |g(R,\theta,\phi)|^2$$

$$g(R,\theta,\phi) = \frac{1}{\pi} \int_0^{2\pi} \int_0^1 r\,dr\,d\phi'\, f(r,\phi')$$

$$\exp i[ur\cos(\phi - \phi') - vr^2 + v'r^2 \cos^2(\phi - \phi') - W(r,\phi')]$$

$$u = \frac{\pi D}{\lambda} \sin\theta, \; v = \frac{\pi D^2}{\lambda R}, \; v' = v \sin^2\theta,$$

$$r = \frac{2\sqrt{x^2 + y^2}}{D}, \; \phi' = \tan^{-1}\frac{y}{x}$$

Thus where $J_0$ is the intensity in the incident beam; k is the ratio of the output flux to input flux; $A(=\pi D^2/4)$ is the area of the test device aperture; $f(r,\phi')$ is the amplitude distribution and; W is the wave aberration function or "optical path difference" (OPD) that describes the deviation of the return wavefront for a retroreflected field in a plane wave.

The one-way aberration function, $W_0$, is one of the means generally used to describe the performance of optical and infrared devices. There is a systematic, but non-trivial, relationship between the $W_0$ and the two-way aberration function, W, which describes the retroreflected wave-front. A matrix formulation for this relationship that holds for the paraxial region is provided below. Thus the Huygens-Fresnel integral, given above, provides a basis for inferring some of the optical performance characteristics from a measured retro-intensity pattern. However, the direct measurement of W, f and k provides more information about the test device. Such measurements, in addition, may be used in the Huygens-Fresnel integral to predict the retro-intensity pattern for all points in space.

In my system the retro-aberration function W is obtained from measurements of the slopes and exit locations of a series of small pencil beams which enter the test device at known aperture locations with known slopes. The measured locations and slopes of all the exiting pencil beams are used to determine the shape of the wavefront that would have been returned were the test object irradiated with a plane wave. The relationship between the measured slopes $(r,\phi')$, and the function $W(r,\phi')$ is $$\delta(r,\phi') = -(2/D)\nabla W(r,\phi')$$

For each value of $\phi'$ a separate scan is made and the measured $\delta$'s are used to estimate the function $W'(r)$ at constant $\phi'$. The entire set of $\phi'$ scans are then used to obtain the function $W(r,\phi')$. The variation of the performance of the test device with field angle is obtained by repeating the above procedure at various aspect angles, $\alpha$.

For example, the non-reciprocal tilt, transverse and longitudinal focal error, distortion, astigmatism, field curvature, third-order spherical aberration and fifth order astigmatism of the test device may be obtained by regressing a set of measured values of $(\delta,r)$, $(\alpha,r')$, wherein $r'$ is the location of the input beam, on the test device $$\delta(r,\alpha) = -(2/D)[A_{11} + A_{12}\alpha A_{13}\alpha^3 + 2r(A_{21} + A_{2}\cdot 2\alpha^2) + 4r^3(A_{31} + A_{32}\alpha^2)]$$

The regression provides estimates of the mean and variance of each $A_{ij}$. These aberration coefficients for the retro-wavefront are then used to infer the properties of the test object. Higher order aberration models are employed as required.

Additional information about the internal structure of the test device is obtained from regressing the measured values of the output location, r, on the input variables $(\alpha,r')$ on the model $$r(\alpha,r') = B_1 + B_2 r' + B_3 \alpha$$

The regression again provides means and variances for each $B_i$, where $B_1$ is a measure of focal plane orientation, and $B_3$ is equal to the effective focal length. The interpretation of focal plane tilt and defocus is accomplished with the aid of a matrix optics formulation described below. The coefficient $B_2$ provides an indication of the quality of the entire data set.

The optical efficiency, k, and the uniformity of image plane radiance is obtained from measurements of the relative intensity in each of the pencil beams as the test device is scanned.

MATRIX THEORY OF PARAXIAL OPTICS WITH TILT AND DECENTRATION

The matrix formulation of paraxial ray optics as described by E. L. O'Neill in Introduction to Statistical Optics, Addison-Wesley, Publ #6, Reading, Mass. (1963), can be extended to include small tilts and decentrations. The general theory of this extension is known in the field; here we describe only the formation needed to treat a tilted mirror in the focal plane of a retro device.

Using the paraxial basis vector $$\begin{pmatrix} \underline{\alpha} \\ h \end{pmatrix}$$

in O'Neill's notation where $\underline{\alpha} = \alpha/n$ is the direction cosine of a ray on a given surface and n is the refractive index of the medium, and the transfer matrix $$M = \begin{pmatrix} A & B \\ C & D \end{pmatrix}$$

representing the composite action of a symmetrical optical train on the paraxial vector, we define an extended transfer matrix $$M_e = \begin{pmatrix} A & B & \delta \\ C & C & d \\ 0 & 0 & 1 \end{pmatrix}$$

acting on the basis vector $$V_e = \begin{pmatrix} \underline{\alpha} \\ h \\ 1 \end{pmatrix}$$

Here $\delta$ and d represent a small tilt and decentration added to the vector $$\begin{pmatrix} \alpha \\ h \end{pmatrix}$$

on the surface associated with M.

If M represents the transfer matrix on the one way path to the reflection plane of a retroreflector, the addition of $$\begin{pmatrix} \delta \\ d \end{pmatrix}$$

represents a tilt and lateral displacement of the reflecting plane. Given $M_e$ for the incoming path it is possible to show that the corresponding transfer matrix for the return path is $$M_e^r = \begin{pmatrix} D & B & D\delta - Bd \\ C & A & C\delta - Ad \\ 0 & 0 & 1 \end{pmatrix}$$

The total system matrix is then $M = M_e^r M_e$.

For a simple lens with tilt in the reflecting plane $$M_e = \begin{pmatrix} 0 & -\frac{1}{f} & 0 \\ f & 1 & f\delta \\ 0 & 0 & 1 \end{pmatrix}$$

and $$M = \begin{pmatrix} -1 & 0 & 0 \\ 2f & -1 & 2f\delta \\ 0 & 0 & 1 \end{pmatrix}$$

Thus the net effect of M acting on a vector $$V_{in} = \begin{pmatrix} \alpha \\ h \\ 1 \end{pmatrix}$$

is to introduce a displacement into the exit ray height giving $$V_{out} = M_e^r V_{in} = \begin{pmatrix} -\alpha \\ 2f\alpha - h + 2f\delta \\ 1 \end{pmatrix}$$

Employing the foregoing fundamental and matrix theory, a truly improved optical system analyzer may be produced.

PHYSICAL EMBODIMENT

As shown in FIG. 1, the laser output beam 9 is produced by a laser 10. Any commercial laser adapted to produce a narrow beam is usable in this application. Two commercial laser generating devices used in the preferred embodiment are the Hughes Aircraft helium neon laser at 0.6328 micrometers, and the Spectrophysics helium neon laser at 1.15 micrometers. A laser test beam generator is generally used because the laser can produce a beam of high brightness or radiance while simultaneously confining the beam to a high degree of collimation which enhances the ability to measure optical properties accurately. A sufficiently narrowly collimated beam to sample the test object entrance pupil at multiple discrete points is necessary to make a meaningful observation as to the complete properties of the test object. Therefore, a very small beam relative to the test object entrance pupil is required.

An incoherent light source could be used in place of the laser where high accuracy of measurement is not necessary. This would be true, for instance, in the case where an eye was the test object. For the purpose of determining an eye glass prescription, accuracy to a small fraction of a diopter is all that is necessary, and for this application, ordinary light may be used. This will be discussed in greater detail below. Also, too much light intensity may injure the eye of the patient so that the brightness of a laser beam must be limited by medical considerations.

A typical value for the test beam brightness for use in eye testing would be ten microwatts per square centimeter per milliradian squared. A higher brightness would be required in binoculars, for instance, where damage to the lens elements is not a problem, and where a higher number of lens elements, each one dissipating a certain amount of light intensity, would dictate higher test beam brightness. For instance, a pair of binoculars may have six elements in series and energy is lost at every element. There is also light loss at the reflective surface at the back of the test object. The retina of the eye reflects about as much light as the reticle in a telescope or as sometimes found in a pair of binoculars, roughly one to two percent.

The laser output beam 9, is however, initially not well shaped and must be formed into a well collimated test beam of approximately one millimeter in diameter, in the preferred embodiment, by a spatial filter 11. Spatial filters are common commercial optical system elements. The filter used in the instant apparatus typically comprises a twenty power microscope objective, a ten micron pinhole, model number 900 p-10, and a ten power microscope objective, e.g. as vended by Newport Research Corp. The spatial filter 11 produces a uniform, narrow output beam 25 and limits spurious radiation.

The output beam 25 is reflected from moveable mirror 12 onto the test object 13. The arrangement of the preferred embodiment is in FIG. 1; the laser output beam 9 and spatial filter output beam 25 are perpendicular to the test object axis 18, spatial filter output beam 25 being reflected by mirror 12 through an angle of ninety degrees to create a test beam 16 which enters the test object 13 parallel to the axis 18.

The moveable mirror 12 is driven to the right or left, as shown by the double headed arrow, by a micrometer scan apparatus 14 which does not vary the angle of the mirror 12 but simply varies the translational position of the mirror allowing the test beam 16 to enter the test object 13 at different off axis points although parallel to the axis 18. The aspect angle may be changed by rotation of Table 13b. The moveable mirror used in this application is a 1/10 wave optical front surface mirror manufactured by Newport Research Corp., and others. The micrometer scan apparatus 14 is made by Klinger Scientific Apparatus Corp., among others. A type MT Translational Stage is an example of one model. This corporation also makes a controller for the positioner, Model #TL17, which contains the electronics to drive the micrometer scan apparatus 14 which is useful in a fully automated and computerized system where the scan is controlled through a closed loop by the computer 15. A dotted line 15a is shown in FIG. 1 to indicate control of all of the micrometer scans by the computer 15.

Figure 1A:
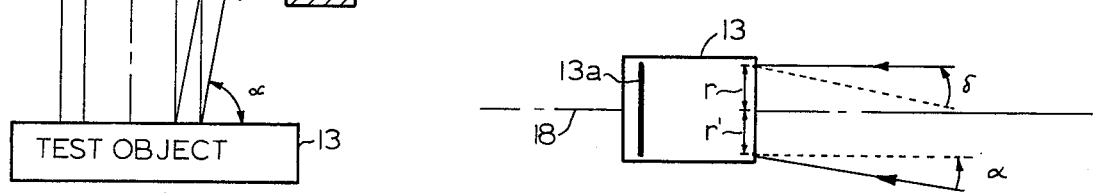
FIG. 1a is a simplified graphical representation showing certain relevant angles involved in this invention.

Again, as shown in FIG. 1, the distance between the point at which the test beam 16 enters the test object 13, and the axis 18 denoted R1, should be equal to the distance between the axis 18 and the point at which the reflected beam 17a exits from the test object 13, denoted R2. In a perfect test object, the reflected beam 17a will be parallel to the test beam 16 at zero aspect angle which is the case illustrated and at a predicted angle for each aspect angle as illustrated in FIG. 1a. For this discussion, it is assumed that the test beam 16 never enters the center point of the test object 13. In this case, the reflected beam 17a and the test beam 16 would exit and enter the test object 13 at the same point. The apparatus could be made to function under this circumstance through the use of a beam splitter above the test object 13. However, this adds unnecessary complexity to the system. It is assumed that, in all practical applications, the test beam 16 will enter the test object and the reflected beam 17a will exit the test object 13 at two different points, resulting in the relationships shown in FIG. 1.

The point EP at which the reflected beam 17a exits the test object 13 is measured by a knife edge 22 which is close to the test object 13 and is driven by a micrometer element 21. The micrometer element 21 is driven toward the left in FIG. 1 until the amount of light remaining in the reflected beam 17a is exactly half the original value. This position then defines the center of the reflected beam 17a and therefore can be used to compute the point EP at which the reflected beam 17a exits the test object 13.

Stationary mirror 19 is identical to moveable mirror 12 and is also positioned at an angle of forty-five degrees to the reflected beam 17a in the described embodiment so that the reflected beam 17b is directed at an angle of ninety degrees into the analyzer lens 20.

In the preferred embodiment, the analyzer lens 20 is a single lens element with a focal length of approximately one meter. The analyzer lens 20 focuses the analyzer lens output beam 26 at point FP, the position of which can be determined, thus establishing the angle of the reflected beam 17a with respect to the test object 13. The accuracy of this measurement may be increased by increasing the focal length of the analyzer lens 20. On the other hand, increasing the focal length requires a higher intensity reflected beam 17b and also makes the equipment larger. The same increased accuracy can be obtained in a more compact form by using a mirror, not shown, to fold the analyzer lens output beam 26. However, this adds to the complexity and cost of the system. In the described embodiment, a single analyzer lens 20 is allowed to focus directly at a focal point FP at a distance of one meter.

Because of the variations in the location of the exit point EP, the slope, and the amount of divergence of the reflected beam 17a as it leaves the test object 13, the location of the focal point FP for each test object 13 may vary. However, the pinhole 23 must be located exactly at the focal point FP if the apparatus is to operate properly. To provide for this accurate positioning, the pinhole 23 is mounted on a three axis micrometer scan platform 27. The Z axis positioning determines the distance between the analyzer lens 20 and the pinhole 23. A perfectly collimated reflected beam will focus at a different point from a beam that is converging or diverging through an angle upon exiting from the test object 13. This divergence, or lack thereof, will be common to all of the test objects 13 in a run of test objects at, for instance, the end of an assembly line, and the Z axis adjustment of the pinhole 23, therefore, is not likely to be reset from one test object 13 to the next.

However, the exit point EP and the angle of the reflected beam 17a with respect to the axis 18 is likely to vary from one test object 13 to the next and therefore the pinhole 23 must be adjusted in the X and Y directions so that the pinhole 23 is exactly at the focal point FP for each individual test object 13. This is accomplished by scanning the pinhole 23 through the X and Y directions to maximize the amount of light falling on the light sensitive diode 24 or equivalent. It is assumed that when there is a maximum amount of light falling on the light sensitive diode 24, the pinhole 23 is, in fact, at the focal point FP for this particular test object 13.

Any commercial light sensor may be used for this application. The one used in the preferred embodiment is model #PIN40B, manufactured by United Detector Technology, Inc. The amplifier is Model #101, manufactured by the same company.

Having defined the exit point EP of the reflected beam 17a through the use of the knife edge 22, and having defined the final analyzer lens focal point FP through the use of pinhole 23, both the exit point EP and the slope of the reflected beam 17a can be calculated by the computer 15. To indicate that the knife edge 22 and pinhole 23 positioning can be accomplished by the computer 15, FIG. 1 shows dotted lines 15a connecting these elements.

The output of the light sensitive diode 24 is amplified through a suitable amplifier or digital to analog converter 25 and is then supplied directly to a computer 15 or, for the benefit of an operator, the output may be supplied to a digital voltmeter 26, which will display a voltage which is a function of the light intensity impinging upon light sensitive diode 24.

To fully categorize a particular test object 13, at one aspect angle readings are taken along two radii at five readings per radius, making a total of ten readings. Each reading consists of a repositioning of moveable mirror 12 to provide a new entrance location for the test beam 16, a repositioning in the X and Y axis of the pinhole 23 to locate a new focal point FP, and the repositioning of the knife blade 22 to locate where the intensity of light at diode 24 is diminished to half, which determines the exit point EP of the reflected beam 17 from the test object 13. Given these parameters and knowing the intensity of the beam measured at diode 24, all of the characteristics of the test object 13 can be computed either by the computer 15 or the test operator.

Figure 4:
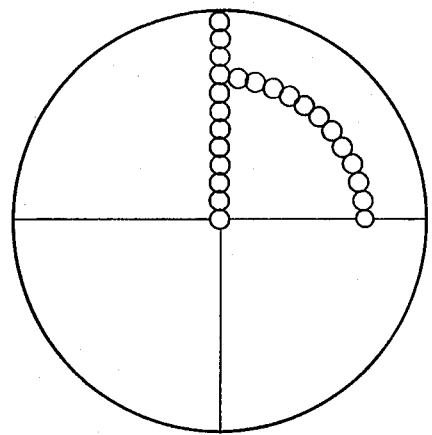
FIG. 4 is an alternative test pattern.

A single set of measurements along one lens radius is sufficient to compute the refraction of the test object and its light efficiency, while the second set of measurements along a radius ninety degrees apart from the first yields astigmatism information in terms of eye tests, or yields information on lens decentering, in the case of lens elements being used in binoculars and cameras. Alternatively, readings along one radius and an annular set of readings, as shown in FIG. 4, would yield the same information.

Figure 2:
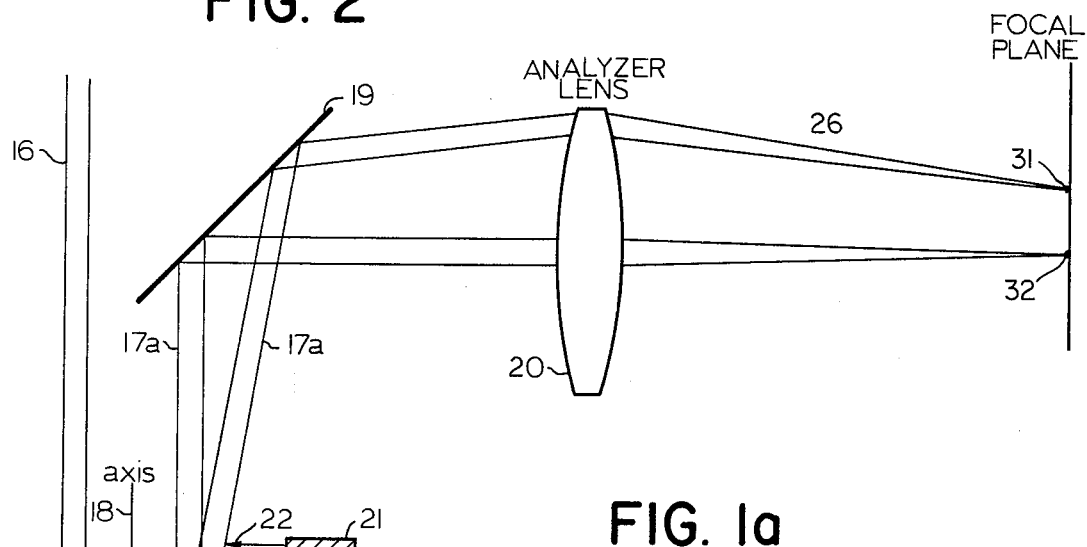
FIG. 2 is a more detailed view showing the spatial relationships between the test object, the test beam, the analyzer lens and the focal plane in terms of two reflected beams leaving the test object at normal and non-normal angles.

FIG. 2 is a more detailed diagram showing the relationship of the final focal point 30, 31 to the original exit angle of the reflected beams, 17a. As shown, a theoretical reflected beam 17a, which exits in parallel with the axis 18, is reflected by stationary mirror 19, travels through the center of the analyzer lens 20 and is focused on a central focal point 30. On the other hand, when testing a practical test object 13 which typically has a significant amount of aberration, the reflected beam 17a will leave the test object at some angled relation from the axis 18, and this angled beam will be reflected by stationary mirror 19 onto a non-central portion of the analyzer lens 20 and then will focus at a point 31 higher or lower than the central focal point 30.

In terms of FIG. 2, the knife edge 22 is shown abutting reflected beam 17a and the Figure assumes but does not show that the pinhole 23 will be scanned to find the actual focal point 31.

For eye testing, the refractive power of the lens need not be measured at an accuracy of greater than a quarter of a diopter since the eye easily adapts to a lens prescription error of that magnitude. Therefore, the distance between analyzer lens 20 and the focal plane may be reduced. Also, as noted, the eye is sensitive to intense light beams. For these reasons, a low intensity source of incoherent light may be used for eye testing if a more economic test apparatus is desired.

Figure 3:
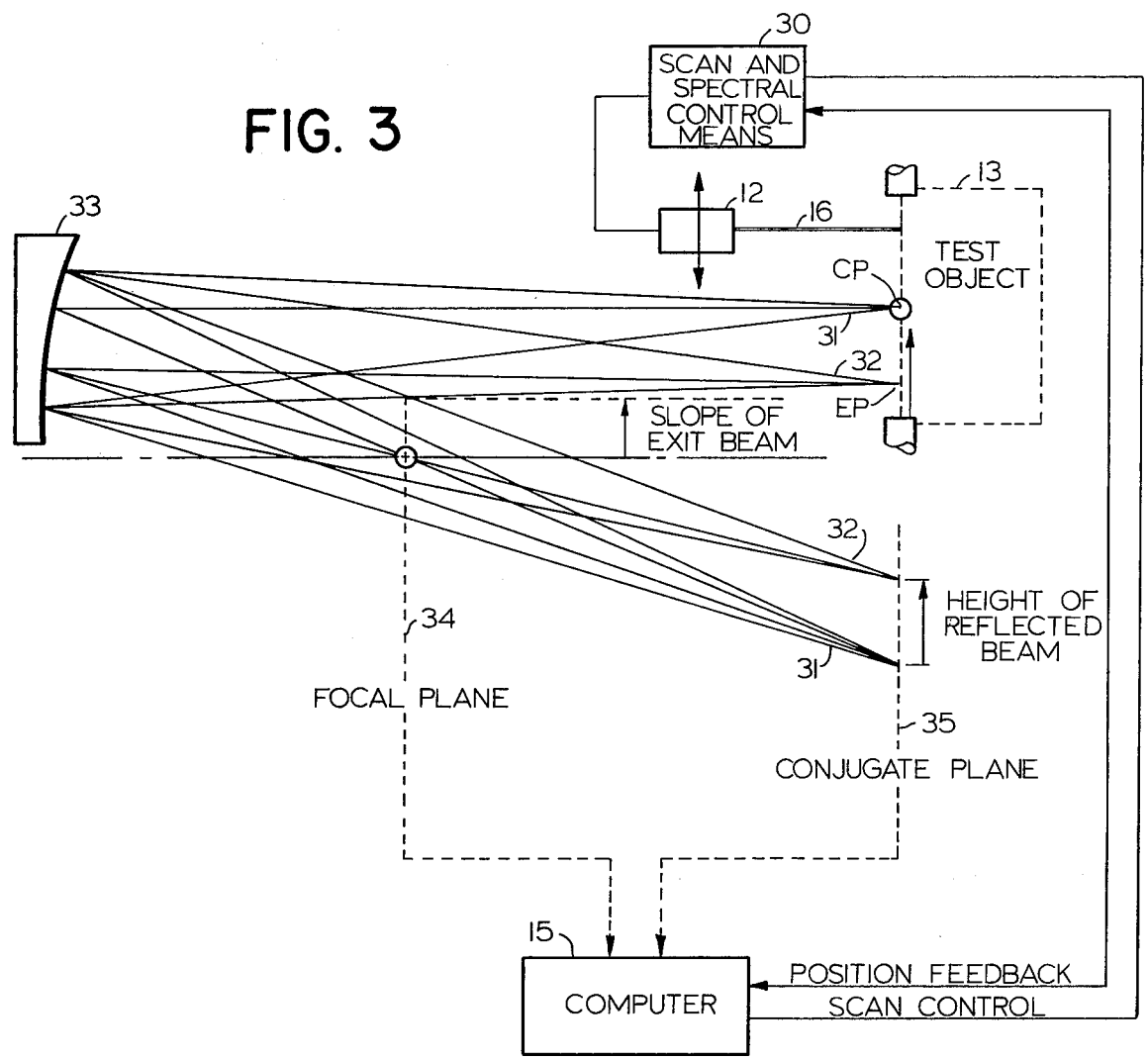
FIG. 3 is a block diagram of an alternate embodiment using an off-axis paraboloid mirror.

An alternate embodiment is shown in FIG. 3. Any commercial means, including the apparatus described in connection with FIG. 1 may be used to generate and locate a test beam 16 in spatial relationship to the test object 13. In FIG. 3, this function is performed by the scan and spectral control means 30 which generates a collimated test beam 16 and mechanically drives a movable mirror 12 or equivalent to position said test beam 16 at a point on the test object 13. A computer 15 sends scan control information to the control means 30 and receives position feedback information from the control means 30 to close the position loop.

Two reflected beams 31, 32 are shown exiting the test object, each being reflected by the off-axis paraboloid mirror 33. Since the test object 13 in this particular installation is located a distance two focal lengths from the paraboloid mirror 33, there is a focus at the focal plane 34 and an image of the test object 13 at the conjugate plane 35.

In this embodiment, as in the embodiment described in connection with FIG. 1, a difference in angular slope of the reflected beam 31, 32 results in a difference of position of the focal point in the focal plane 34. This point can be determined, as it is in the FIG. 1 apparatus, through the use of a pinhole mounted on a three axis micrometer platform. However, in this embodiment, the beam continues on to create an aperture image at the conjugate plane 35. Therefore, the height of the exit beam will be equal to the distance between the exit point of the reflected beam 32 and the test object center point CP. A detector mounted on a two axis micrometer scan platform at this conjugate plane 35 can be used to determine the point at which the reflected beam 31, 32 crosses the conjugate plane and therefore the point at which the beam leaves the test object 13.

In this FIG. 3 embodiment, any means for determining the location of the reflected beam at the conjugate plane could be used instead of a light detector and micrometer scan platform. One alternative is an image dissector tube, a commercially available T.V. camera-like device which produces an electrical signal as a function of the position of the light input.

A quadrant detector and a light detector mosaic would be functional equivalents. All of these devices act as an electrical equivalent of a light detector mounted on a micrometer platform.

The advantage of the FIG. 3 embodiment is that it is more easily adapted to a fully automatic mode of operation since the mechanical positioning of a micrometer platform is not required to measure the height of the reflected beam, the measurement being done electrically in this case through the use of one of the electrical devices mentioned above.

The apparatus described herein satisfies the industry requirement of a compact, low cost test apparatus that is accurate and adapted to be fully automated. The size and cost are low since the entire optical test system is assembled from small and common optical devices. The accuracy is a function of the analyzer lens or paraboloid mirror focal length and may be optimized for the application. Finally, all devices are controllable by computer allowing a fully automated test system and a printout of test results.

Certain obvious modifications may be made to this basic apparatus to adapt it to an individual use as will be obvious to one skilled in the optical arts. For instance, the light path may be changed by suitable arrangement of mirrors to fit into any particular test station environment.

This system may also be used with lasers in the ultra-violet or infra-red light frequencies, to test optical systems used in the medical and military surveillance fields, among others. Lasers to produce infrared frequencies in the three to five, and eight to twelve micron ranges would be more likely to be used, as well as ultra-violet light in the range of 0.2 to 0.4 microns.

The above described embodiments of this invention are merely descriptive of its principles and are not to be considered limiting. The scope of this invention instead shall be determined from the scope of the claims including their equivalents.

What is claimed is:

1. Apparatus for determining the optical properties of a test object having an optical axis and light transmission properties between first and second spaced light transparent surfaces comprising:
   means for generating a test beam of light parallel to the optical axis of said test object and directed at a point on said first surface, through said test object, and to said second spaced surface;
   a reflector located adjacent said second spaced surface of said test object for reflecting all or part of said test beam back into and through said test object as a reflected beam;
   means for determining the point at which said reflected beam exits said test object at said first surface; and
   means for measuring the intensity of said reflected beam immediately after said reflected beam exits said first surface of said test object
   whereby the reflected beam exit location and intensity constitute measures of the optical properties of said test object.

2. The apparatus of claim 1 wherein said means for generating comprises:
   a laser beam generator;
   a spatial filter for forming said laser beam into a highly collimated and narrow diameter light beam;
   means for introducing said narrow diameter light beam into said test object at a predetermined lateral position with respect to the optical axis of said test object; and means spaced from the first surface of said test object for detecting the position of greatest intensity of said reflected beam as a function of any optical aberrations of said test object.

3. The apparatus of claim 2 wherein said means for measuring comprises:
an analyzer means for focusing said reflected beam at a focal point,
light detector means located so that said focal point is between said analyzer lens and said light detector for measuring the intensity of light transmitted through said lens; and
pinhole means for locating a pinhole at the point where said reflected beam is focused, said location being determined by moving said pinhole through three axes of motion to a point where a maximum amount of light falls on said light detector.

4. The apparatus of claim 3 wherein said pinhole means comprises:
a mask defining a pinhole; and
a three-axis micrometer scan platform on which said pinhole mask is located, said platform adapted to use said pinhole to scan the focal plane of said analyzer lens to find the location of said beam focal point, said location being the point at which the light detector measurement is maximum.

5. The apparatus of claim 4 wherein said means for determining the point at which said reflected beam exits comprises:
a knife edge for partially blocking the light in said reflected beam; and
a one-axis micrometer scan for varying the position of said knife edge to determine the point where said reflected beam light will be reduced to one half of its originally measured intensity.

6. The apparatus of claim 5 further comprising means for varying the point at which said test beam intersects said first surface.

7. The apparatus of claim 6 wherein said laser beam generator and said spatial filter are stationary, said apparatus further comprising:
a mirror for reflecting said test beam from said spatial filter onto said first surface; and
a micrometer scan for varying the mirror position to vary the position at which said test beam intersects said first surface.

8. Apparatus for determining the optical properties of a test object having an optical axis and light transmission properties between a first and second optical surface comprising:
means for generating a narrow diameter, collimated, test beam parallel to the optical axis of said test object directed at a point on said first optical surface of said test object and through said test object;
a reflector positioned adjacent to the second optical surface of said test object for reflecting said test beam back through said test object as a reflected beam;
knife edge means adapted to be positioned where half of said test beam light will be blocked;
means for determining the test beam exit angle with respect to the optical axis of the test object; and
means for measuring the light flux transmitted through said means for determining, and for generating an electrical signal which is a function of the amount of said light flux.

9. The apparatus of claim 8 wherein said means for determining the test beam exit point comprises:
means for laterally displacing the path of the test beam with respect to the optical axis of the test object;
an analyzer lens for focusing said reflected beam at a focal point; and
pinhole means adapted to scan a pinhole through said focal point, the focal point being defined as the point at which the pinhole is located when said means for detecting detects a maximum amount of light.

10. The apparatus of claim 9 wherein said means for generating comprises:
a laser for generating a beam of coherent light;
a spatial filter for collimating and narrowing said beam; and
means for introducing said narrow diameter light beam into said test object at a predetermined lateral position with respect to the optical axis at said test object.

11. The apparatus of claim 10 wherein said means for locating comprises:
a knife edge close to said first optical surface for partially blocking the light of said reflected beam; and
a knife edge micrometer scan for moving said knife edge into said reflected beam.

12. The apparatus of claim 11 wherein said pinhole means comprises:
a mask defining a pinhole located in close proximity to said focal point; and
a three axis micrometer platform on which said pinhole mask is mounted, adapted to scan said pinhole to a position that results in a maximum amount of light falling on said light detector means, thereby determining the location of said focal point.

13. The apparatus of claim 12 further comprising a digital voltmeter for measuring the electrical signal generated by said means for detecting.

14. The apparatus of claim 12 further comprising means for varying the point at which said test beam enters said test object.

15. The apparatus of claim 14 wherein said means for varying comprises:
a mirror for reflecting said test beam from said spatial filter onto said test object; and
a mirror micrometer scan for varying the mirror position to vary the location at which said test beam enters said test object.

16. The apparatus of claim 15 further comprising a computer for controlling said mirror micrometer scan, said knife edge micrometer scan and said three axis micrometer platform for receiving the output of said means for detecting, and for generating a print-out of said test object optical properties.

17. A method of determining the optical properties of a test object having a pair of spaced optical surfaces and an optical path therebetween comprising the steps of:
directing a narrow diameter, collimated, test beam of light at a point on the first of said pair of optical surfaces of said test object, and through said test object;
reflecting said test beam back through said test object;
first, determining the center of said reflected beam at a point close to said first of said pair of optical surfaces;

second, determining the center of said reflected beam at a point distant from said first of said pair of optical surfaces; and measuring the light flux in said reflected beam.

18. The method of claim 17 in which the test object is a circular lens further comprising the repetition of said method at a plurality of points along one radius line of said entrance pupil.

19. The method of claim 18 further comprising the repetition of said method along a plurality of radii.

20. The method of claim 18 further comprising the repetition of said method along a second radius at an angle of ninety degrees from the first radius.

21. Apparatus for determining the optical properties of a test object having first and second opposed optical surfaces and an optical axis therebetween comprising;

means for generating a test beam parallel to the optical axis of said test object and directed at a point on said first surface, and through said test object;

a reflector located adjacent to the second and opposite surface of said test object for reflecting all or part of said test beam back into and through said test object as a reflected beam;

an off-axis paraboloid mirror located two focal lengths from said point for reflecting said reflected beam;

first means, located at said paraboloid mirror focal plane, for determining the slope of said reflected beam; and second means, located at the conjugate plane of said off-axis paraboloid mirror, for determining the height of said reflected beam.

22. The apparatus of claim 21 wherein said first means for determining comprises a pinhole mounted on a two axis micrometer scan platform.

23. The apparatus of claim 22 wherein said second means for determining further comprises means for measuring the intensity of said reflected beam.

24. The apparatus of claim 23 further comprising a computer for controlling said means for generating and said first means for determining, and for receiving the output of said second means for determining.

25. A method of determining the optical properties of a test object having first and second spaced optical surfaces and an optical axis therethrough comprising the steps of:

directing a narrow diameter, collimated, test beam of light at a point on the first of said pair of of optical surfaces of said test object;

reflecting said test beam back through said test object;

reflecting said reflected test beam by an off-axis paraboloid mirror located two focal lengths away from said test object;

first, determining the location of the focal point at the focal plane to determine the slope of said test beam;

next, determining the height of said test beam at the conjugate plane to determine the exit point.

26. The combination in accordance with claim 1 or claim 8 wherein said reflector comprises a portion of the test object.

* * * * *